United States Patent [19]

Roberts et al.

[11] Patent Number: 4,722,759
[45] Date of Patent: Feb. 2, 1988

[54] APPARATUS FOR FABRICATING DRIP IRRIGATION TAPE

[75] Inventors: James C. Roberts, Escondido; David E. Mominee, Alpine, both of Calif.

[73] Assignee: James C. Roberts, Escondido, Calif.

[21] Appl. No.: 707,451

[22] Filed: Mar. 1, 1985

[51] Int. Cl.⁴ .............................................. B29D 23/00
[52] U.S. Cl. ..................... 156/203; 156/218; 156/244.15; 156/244.25; 156/466; 239/542; 239/547
[58] Field of Search ............... 156/203, 466, 215, 217, 156/218, 244.11, 244.15, 244.25; 239/542, 547; 138/128, 151

[56] References Cited

U.S. PATENT DOCUMENTS 4,173,309 11/1979 Drori ............................ 239/547 X
4,413,787 11/1983 Gilead et al. ........................ 239/542
4,473,191 9/1984 Chapin ................................ 239/542

Primary Examiner—David Simmons
Attorney, Agent, or Firm—Brown, Martin, Haller & Meador

[57] ABSTRACT

An apparatus is disclosed for fabricating drip irrigation tape from a water impervious polyethelene film. A shaping assembly with a water-cooled vacuum drum preforms a groove along one edge, a folding device folds the strip lengthwise to form a first conduit, and a sealing assembly with an electrically-heated heat sealing wheel joins the edges along opposite sides of the groove to form a seam in which the groove defines a secondary conduit that is resistant to deformation. Flat spots on a pair of outwardly-extending annular ribs around the circumference of the heat sealing wheel produce breaks in the seam for inlet ports and outlet ports.

18 Claims, 18 Drawing Figures

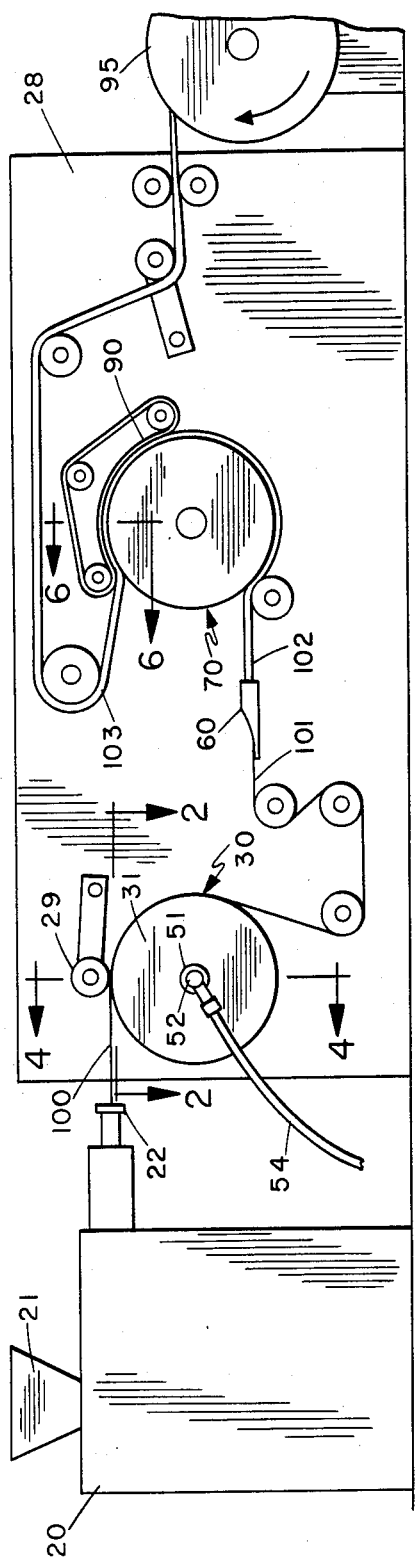
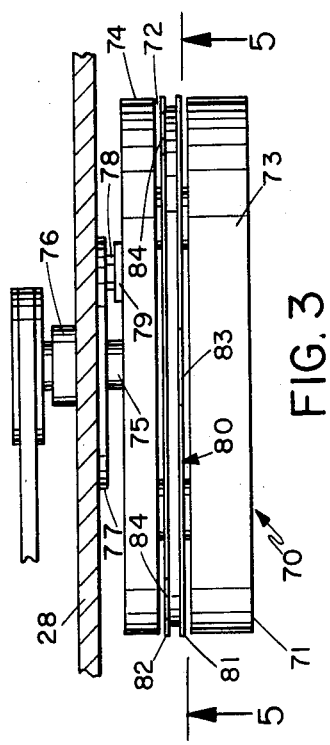
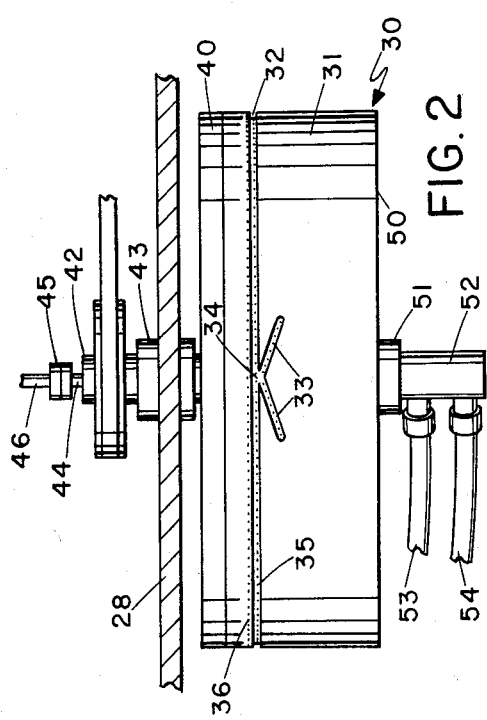

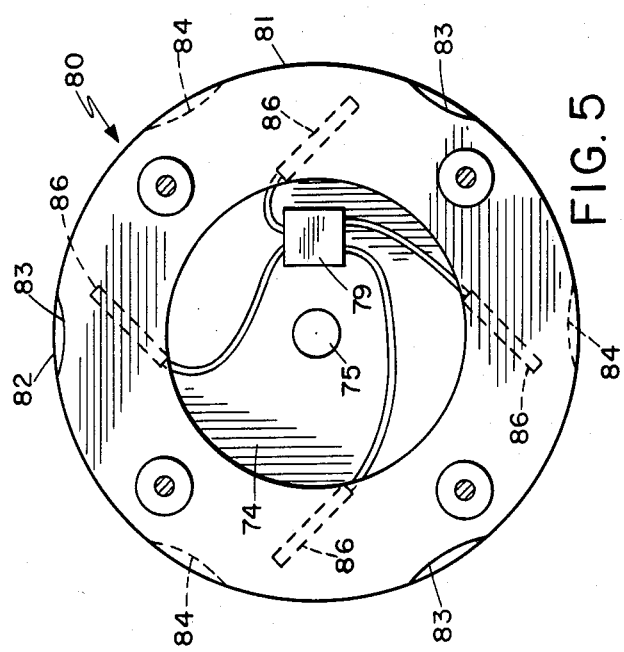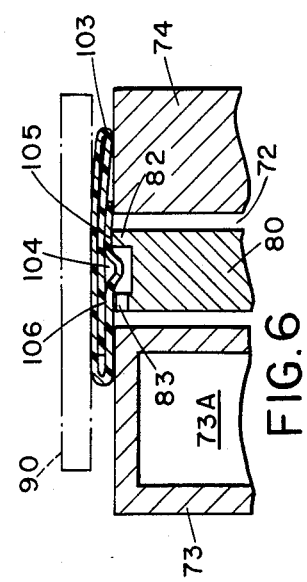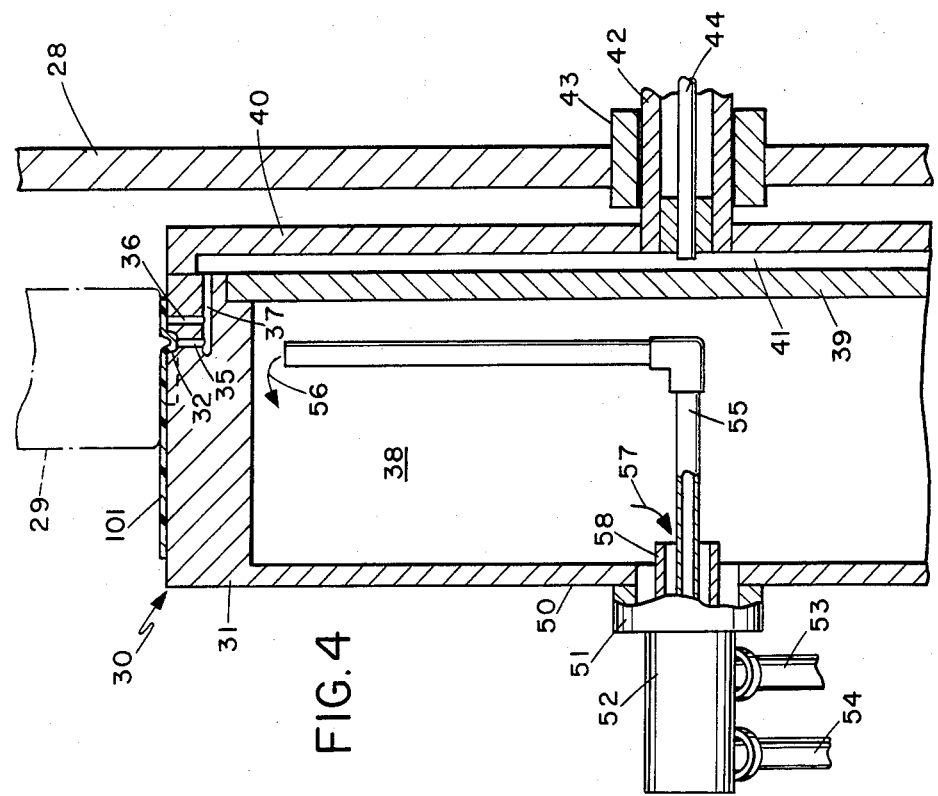

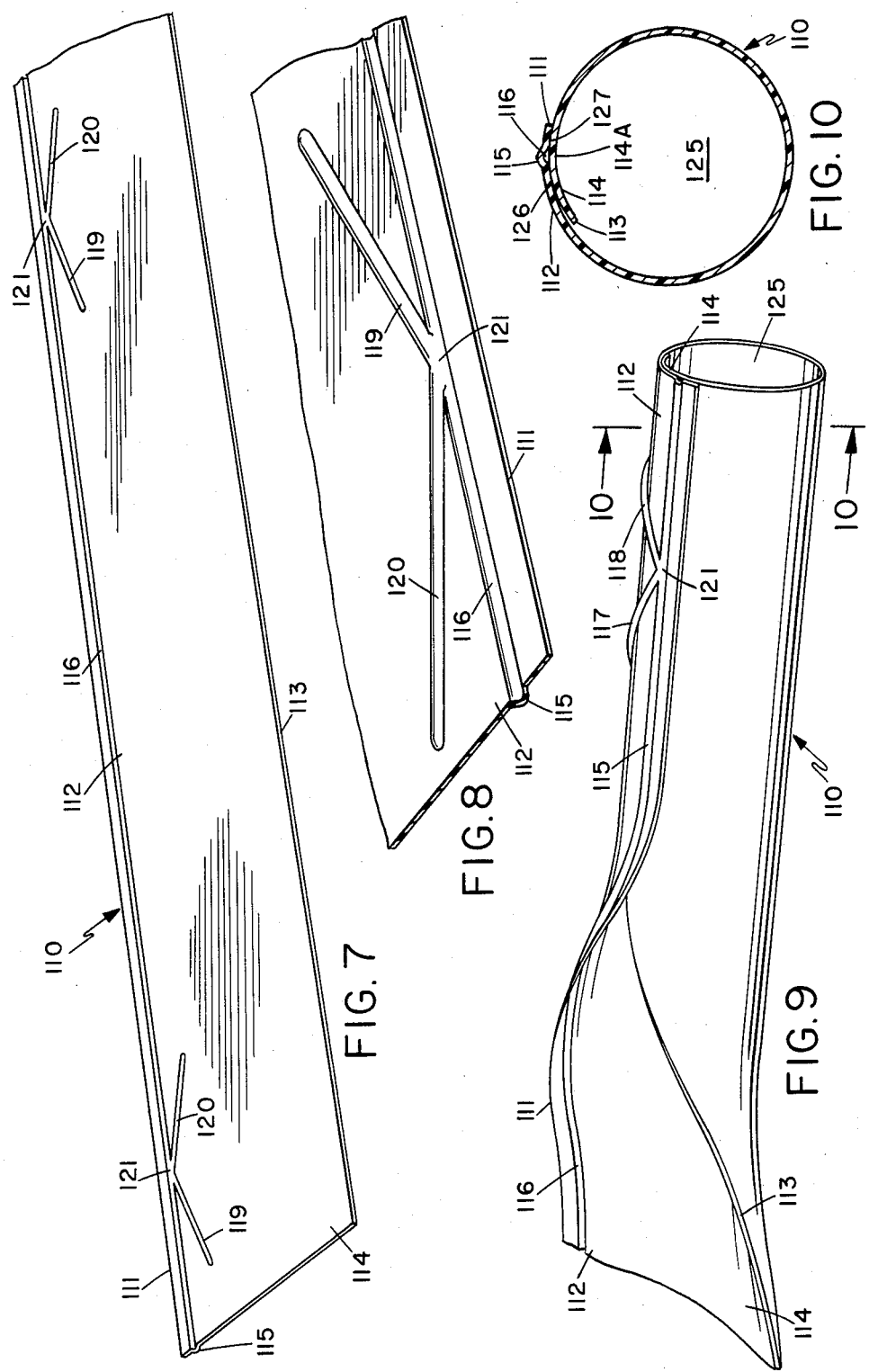

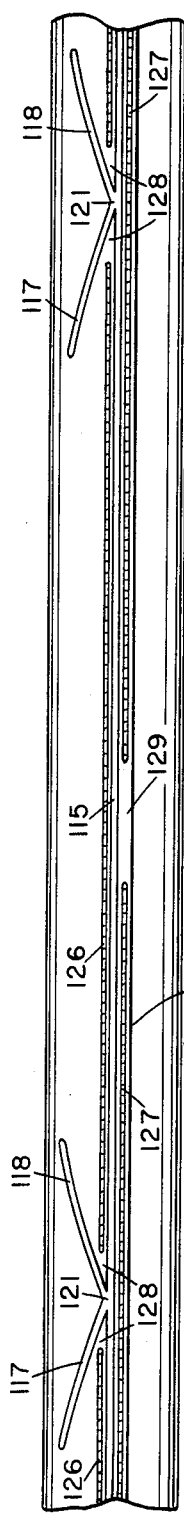
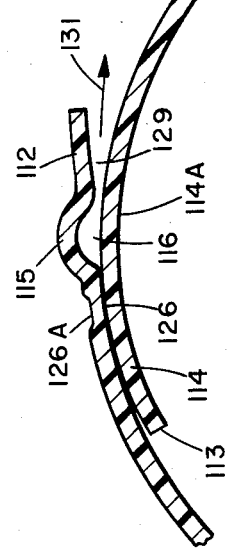
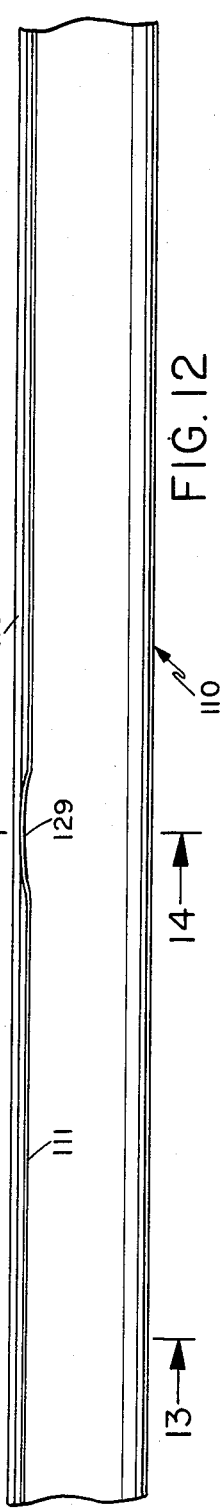
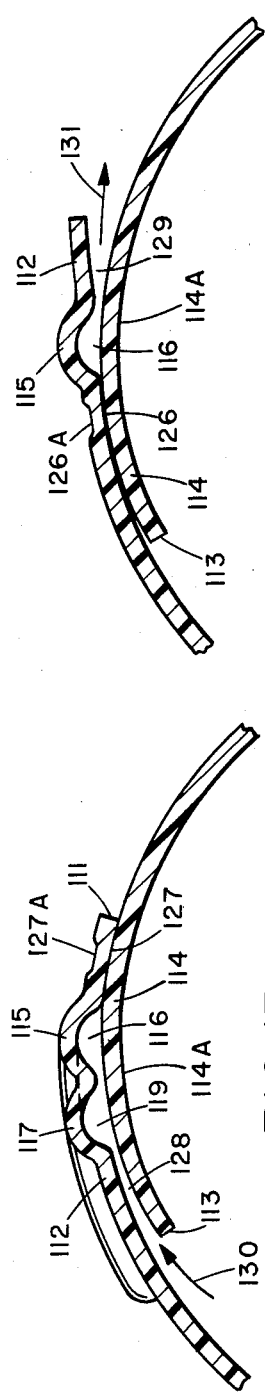
FIG. 11
FIG. 12
FIG. 14
FIG. 13

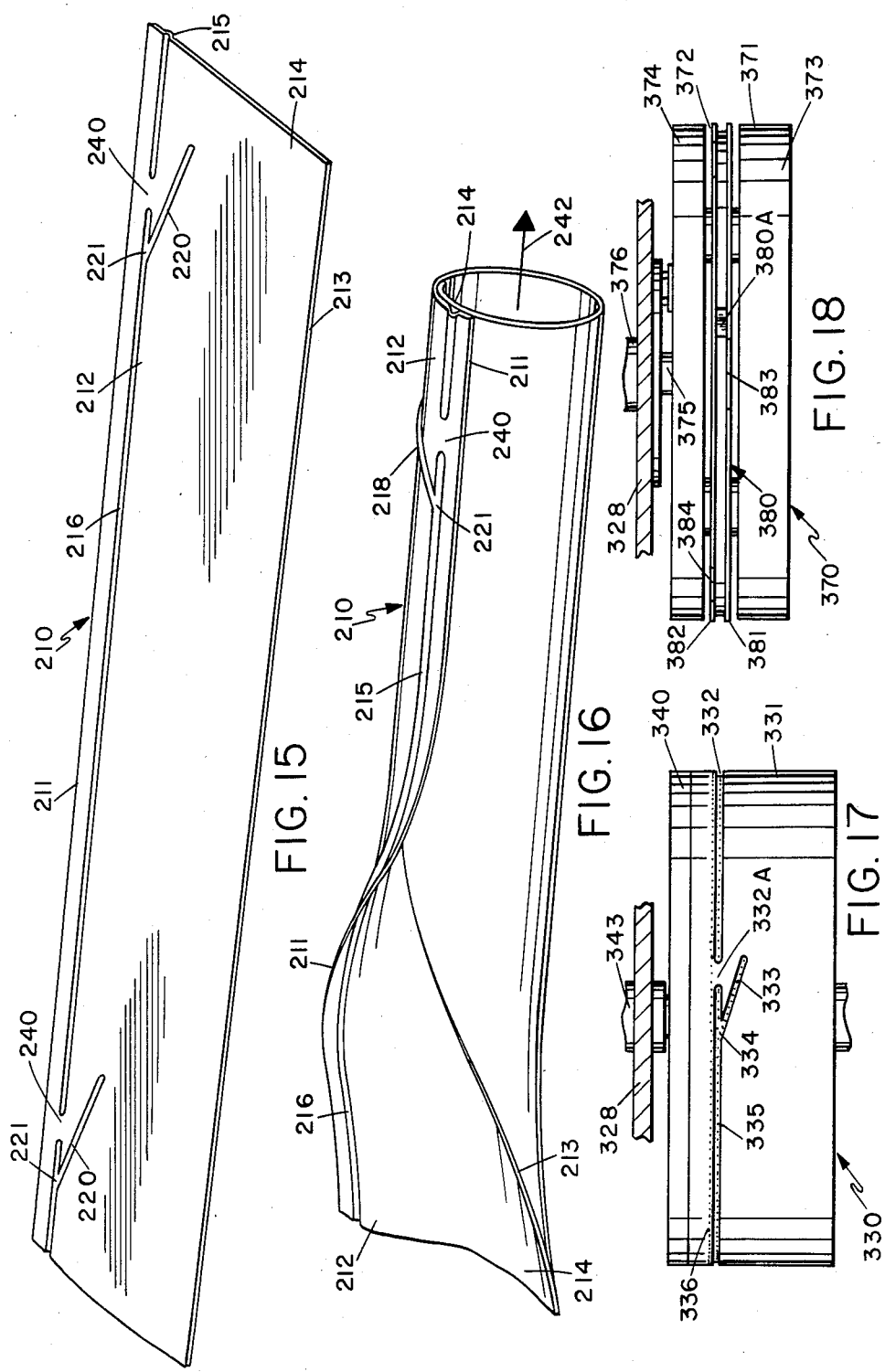

APPARATUS FOR FABRICATING DRIP IRRIGATION TAPE

CROSS REFERENCE TO RELATED APPLICATIONS

The copending application entitled "Drip Irrigation Tape" filed the same date as this application is related.

BACKGROUND OF THE INVENTION

This invention relates generally to irrigation and particularly to drip irrigation tape and its fabrication.

The drip irrigation system is far less noticeable than many of its counterparts. Instead of spraying large amounts of water over the crops, it supplies less water more effectively through lengths of tubing placed near the roots where drops of water emitted through small outlets moisten the soil just the right amount. Crops improve, salt accumulation and fertilizer loss decreases, and water is conserved.

In addition to its low profile and effective performance, this clever and inherently simple technique is easier and less expensive. As a result, it has come into such widespread use that many miles of irrigation tubing are in demand, the generally flat plastic tubing called drip irrigation tape being especially popular.

This type of tubing lies flat for easy handling. It can be rolled up on reels for transportation and to ease distribution over a field. Once water is introduced, it swells like the perforated sprinkling hose used to water the front lawn, and as water flows under pressure within, outlets along the tubing emit drops of water into the soil to water the crops at their roots where most needed and at a rate most beneficial.

Much of today's drip irrigation tape is fabricated from a thin pliable plastic strip folded lengthwise. The two edges are overlapped and joined together to form a flat hollow tape that may be on the order of one inch wide. Under pressure, it swells toward the general shape of cylindrical tubing with an inside diameter that may be about five-eighths inch. This is the main conduit for irrigation water—the main passageway for water flowing to crops under irrigation.

But unlike sprinkling hose, drip irrigation tape also employs a much smaller secondary conduit. It is usually located along the seam formed by the overlapping edges of the plastic strip and it extends along the tape adjacent the main conduit as a narrow passageway that helps reduce the rate at which water is emitted into the soil. Water supplied to the main conduit spends its energy finding its way into the secondary conduit through a series of inlets interconnecting the two, and then forcing its way along the secondary conduit to a series of outlets where it slowly trickles out drop by drop into the soil.

This is the secret of drip irrigation tape that makes it so effective—slow built-in leaks evenly spaced along its length—and the design details accomplishing this are critical to inexpensive manufacture and successful operation in a drip irrigation system. By focusing on these details, we can appreciate some of the problems in existing designs that need to be overcome.

The seam and secondary conduit are especially important. The seam in some designs, for example, is formed by joining the overlapping edges of the plastic strip together with an adhesive applied lengthwise down the tape in two fine parallel lines, the space between the two adhesive beads serving as the secondary conduit. One such design employs thin monofilament fishing line that is first dipped in adhesive and then applied between the edges to form the beads.

While these designs employ the expedient of making the secondary conduit part of the seam, they have certain drawbacks. In the first place, the adhesive beads constitute additional material and additional steps in the fabrication process. They must be accurately applied and carefully controlled to maintain dimensioning that will achieve a consistent drip rate along the tape.

Furthermore, the secondary conduit is often prone to collapse due to an apparent eletrostatic affinity of the overlapping edges for each other. Whether in manufacturing, through handling, or while buried in the middle of a field under irrigation, the secondary conduit often becomes deformed so that the overlapping edges of the plastic strip touch and stick together in the gap between the adhesive beads. When this happens, the secondary conduit becomes blocked and the tape malfunctions.

Other designs have their drawbacks also. For instance, the needle holes of a stitched seam used as outlets in one design and the laser-cut slits in another often become blocked by soil or particulate material in the irrigation water and the tape manfunctions. In addition, fabrication is more involved.

Thus, while existing designs generally employ a two-conduit approach to achieve a slow controlled drip rate, they have certain specific drawbacks related to fabrication, operation, and reliability.

Consequently, it is desirable to have a new and improved drip irrigation tape that alleviates these concerns —one easily and inexpensively manufactured, able to achieve a consistance drip rate along its length, and less susceptible to malfunctioning—and an apparatus for its fabrication.

SUMMARY OF THE INVENTION

This invention recognizes the problems associated with existing designs and provides an apparatus for fabricating an improved drip irrigation tape with the desired attributes.

The apparatus includes components for shaping a strip of flexible material, such as a thin plastic film, into the drip irrigation tape. A shaping assembly is included that preforms a groove along one edge of the strip. A folding device then folds the strip lengthwise with the edges overlapping to form a first conduit. Finally, a sealing assembly joins the two edges of the strip together on opposite sides of the groove to form a seam in which the groove defines a secondary conduit that is resistant to deformation.

The sealing assembly provides breaks in the seam that define a series of inlet ports between the first conduit and secondary conduit and a series of outlet ports between the secondary conduit and the exterior of the tubing. This passageway is dimensioned to impede fluid flowing through the secondary conduit as a means of achieving a desired drip rate along the tape exterior without relying on outlet dimensioning.

Thus, the apparatus forms a tubing structure with a preformed groove that resists deformation. And it does so in a continuous operation that is easy and inexpensive. These features combine to alleviate many concerns normally associated with drip irrigation tape and its fabrication.

The above and other objects and advantages of the invention will become more fully apparent upon reading the detailed description in conjunction with the accompanying drawings.

BRIEF DESCRIPTION OF THE DRAWINGS

FIG. 1 of the drawings is a side elevation view of an apparatus constructed in accordance with the invention;

FIG. 2 is an enlarged top plan view of the shaping assembly as taken on line 2—2 of FIG. 1;

FIG. 3 is an enlarged top plan view of the sealing assembly;

FIG. 4 is an enlarged sectional view taken on line 4—4 of FIG. 1;

FIG. 5 is an enlarged sectional view taken on line 5—5 of FIG. 3;

FIG. 6 is an enlarged sectional view taken on line 6—6 of FIG. 1;

FIG. 7 is a perspective view of an unfolded portion of the flexible strip used in an exemplary embodiment of the tubing structure, illustrating the preformed edge portion prior to folding;

FIG. 8 is an enlarged detail of the flexible strip showing the junction of the groove with a pair of inlet channels;

FIG. 9 illustrates the folding of the flexible strip into the tubing;

FIG. 10 is an enlarged sectional view taken on line 10—10 of FIG. 9;

FIG. 11 is a top plan view of a portion of the completed tubing;

FIG. 12 is a side elevation view of the tubing;

FIG. 13 is an enlarged sectional view taken on line 13—13 of FIG. 12;

FIG. 14 is an enlarged sectional view taken on line 14—14 of FIG. 12;

FIG. 15 is a perspective view of an unfolded portion of the flexible strip used in an alternate embodiment of the tubing structure;

FIG. 16 illustrates the alternate embodiment partially folded;

FIG. 17 is an enlarged plan view of a portion of an alternate shaping assembly used to preform the strip of FIG. 15; and FIG. 18 is an enlarged plan view of a portion of an alternate sealing assembly used to seal the tubing of FIG. 16.

DETAILED DESCRIPTION

An exemplary embodiment of an apparatus for fabricating drip irrigation tape, or tubing, is shown in FIG. 1. It includes an extrusion device in addition to the other components for forming a thin polyethylene film. The extrusion device is referred to generally by reference number 20, and it employs known components, including hopper 21 into which a suitable raw material such as polyethylene beads are placed, and an extrusion die 22 through which a thin film of flexible polyethylene material is forced.

This strip of flexible material is used to form the tubing. For purposes of illustrating tubing fabrication, it is referred to in its unformed state by reference number 100, after preforming by reference 101, after folding by reference number 102, and after heat sealing by reference number 103 (FIG. 1).

Main frame 28 supports the various components employed to fabricate the tubing. These components include roller 29 which bears against strip 100 as it passes over shaping assembly 30 where it is preformed to include a groove along one edge.

Shaping assembly 30 includes first drum 31 (FIGS. 1 and 2). This drum has a three foot circular circumference that includes inwardly extending annular channel 32, and pairs of auxiliary channels 33 that intersect the annular channel at junctions 34 located at one-foot intervals around the circumference. These channels serve as a form into which the strip is forced during the preforming operation.

Strip 100, which remains heated to approximately 400 degrees fahrenheit from the preceding extrusion operation, passes the first drum where a vacuum drawn by suitable means through suction inlets 35 in annular channel 32 and channels 33 suck the strip into the channels to preform a groove extending lengthwise along one edge. A vacuum drawn through second vacuum inlet holes 36 sucks the strip against the first to inhibit slippage between the strip and the drum.

The first drum is rotatably connected by axle 42 and bearing 43 to support frame 28. Vacuum tube 44 supplies the required vacuum to the vacuum inlet ports through rotary vacuum coupling 45 from vacuum tube 46 which is connected to a suitable vacuum source. And as the strip is sucked into the desired shape while passing over the first drum, it cools sufficiently to retain its shape.

The illustrated embodiment also includes means for cooling the first drum to accelerate cooling of the strip. Front face 50 of first drum 31 includes rotary coupling 51 which combines with manifold member 52 to maintain good communication between the interior of first drum 31 and both water outlet hose 53 and water inlet hose 54. This structure combines to cool the first drum so that strip 100 cools after it is preformed into annular channel 32 and channels 33.

The strip of flexible material leaves first drum assembly 30 preformed. It is designated in FIG. 1 by reference numeral 101 at this point as it proceeds onto folding device 60. The folding device is a suitable known mechanical structure that folds the tape lengthwise as it passes through, the folded tape being designated by reference numeral 102 after this operation.

The folded strip of flexible material is then heat sealed by sealing assembly 70 (FIGS. 1 and 3). It is heat sealed in the sense that the two edge portions of the strip are pressed together while heated so that they bond together. The sealing assembly includes second drum 71 for doing this, and it has a three foot circumference like the first drum. It includes a recessed portion 72 that separates the drum into front portion 73 and rear portion 74. Within this recess portion is set a brass heat sealing wheel, heat wheel 80. This wheel has a pair of outwardly extending annular ribs 81 and 82 that are spaced apart about ⅛ inch. These ribs extend outwardly from the circumference of the second drum to apply pressure to the overlapping edge portions of strip 102 while at the same time heating the strip to effect a heat seal as the strip passes over the drum. The illustrated ribs are about 0.050 inch wide and they extend outwardly about 0.035–0.040 inch for this purpose.

Flat spots 83 along rib 81 (only one being visible in FIG. 3) provide breaks in the seam which serve as inlet ports. Flat spots 84 along rib 82 provide breaks in the seam that serve as outlet ports. These flat spots prevent pressure and heat from being applied by the brass wheel to the strip so that a break is produced in the seam at selected locations along the strip. First drum 31 and second drum 71 are synchronized by suitable means such as a toothed belt to cause these breaks in the seam to appear at the locations where the inlet ports and outlet ports are desired. The brass heat wheel is electrically heated with the folded tubing passing between it and pressure belt assembly 90 as shown in FIG. 1, the pressure belt assembly pressing the strip against the heat sealing wheel to effect the heat seal.

Second drum 73 is rotatably mounted on support frame 28 by axle 75 and bearing 76. Suitable means such as commutator rings 77 and contacts 78 serve to couple electrical energy from an external source (not shown) to junction box 79, from which it is coupled to electrical cartridge resistors. These resistors are know electrical devices attached to the heat sealing wheel to heat the wheel.

Further details of the shaping assembly are shown in FIG. 4. Preformed strip 101 is shown in position on the circumference of first drum 31 under pressure of roller 29. The flexible material of which it is composed is sufficiently heated and therefore formable to be sucked down into annular channel 32 by a vacuum drum in vacuum inlets 35. It is also sucked against the circumference of first wheel 31 to inhibit slippage by a vacuum drawn in vacuum inlets 36. These vacuum inlets connect to passageway 37 formed by holes drilled in the drum. Interior 38 of the drum is enclosed by back plate 39, and manifold member 40 is suitably attached to the drum to define plenum 41. Vacuum tube 44 provides fluid communication between the plenum and the rotary vacuum coupling illustrated in FIG. 2.

Details of the water cooling components are also illustrated in FIG. 4. Water flowing in via inlet hose 54 passes through inlet pipe 55 and out into interior 38 of the first drum. Arrows 56 and 57 show the path this water takes as it cools the drum, and as it exits through outlet member 58 to water outlet hose 53. By this structure a flexible strip having a temperature of about 400 degrees fahrenheit as it first passes onto the first drum may be reduced to a temperature of 300 degrees fahrenheit as it leaves the first drum. At this lower temperature the strip retain the desired shape with the preformed groove.

Further details of the heat sealing wheel are shown in FIGS. 5 and 6. The illustrated embodiment includes three flats spots at regular intervals on rib 81 and three flat spots 84 spaced therebetween at regular intervals on rib 82. Flat spots 83 are aligned to overlie the locations where breaks for outlet ports are to occur along the finished tubing, and flat spots 84 are aligned to overlie the locations where breaks for inlet ports are to occur.

Details of the electric cartridge resistors are illustrated in FIG. 6. These resistors are embedded in the wheel by suitable means such as bonding them within holes in the wheel, and they are electrically interconnected with junction box 79 by suitable electrical wiring.

As folded strip 102 is passed between pressure belt assembly 90 and the second drum, the preformed portion of the strip is straddled by annular ribs 81 and 82. The strip is pressed between the ribs and pressure belt assembly to effect a heat seal on opposite sides of groove 104 to form the heat sealed strip 103 (FIG. 6). Annular rib 82 is shown in FIG. 6 forming heat sealed portion 105, and flat spot 83 on annular rib 81 is shown resulting in break 106 on the opposite side of the groove. Break 106 serves as an inlet port in the finished drip irrigation tape. Interior portions 73a of the second drum in FIG. 6 illustrates that the second drum may also be water cooled by passing water through this interior, rear portion 74 of the drum being cooled by conductive heat transfer.

Heat sealed strip 103 represents the finished drip irrigation tape which is accumulate by conventional means on reel 95 in FIG. 1. Thus, the apparatus of this invention enables easy and inexpensive fabrication of a new and improved drip irrigation tape that resists deformation and malfunctioning. And it is readily adapted to the continuous fabrication process illustrated—from extrusion through storage on reels.

The following description of the drip irrigation tape structure and method for its fabrication further highlights the invention. An unfolded portion of the flexible strip used in the illustrated embodiment of the drip irrigation tape is shown in FIGS. 7 and 8 where it is referred to generally by reference number 110 and shown to include a thin flexible film of water impervious material, such as polyethylene. The strip is suitably dimensioned for folding into a piece of tubing, the illustrated embodiment being on the order of 2⅝ inches wide and 4–25 mils thick. It is folded and the edges joined together in the finished tubing to form a first conduit, the main conduit through which water flows to crops under irrigation.

Adjacent longitudinally-extending edge 111 of strip 110 is first edge portion 112 that extends lengthwise along the strip. And adjacent longitudinally-extending edge 113 of strip 110 is second edge portion 114 which also extends lengthwise along the strip. One of these edge portions is preformed with a groove while the other is retained relatively flat.

First edge portion 112 is preformed so that preformed portion 115 defines groove 116 extending lengthwise along the strip. This may be accomplished by suitable means such as heating the strip until it is formable (around 400 degrees fahrenheit for the polyethylene of the illustrated embodiment) and pressing it between rollers that are shaped to preform the groove into the first edge portion. Drum assembly 30 and related components in FIG. 1 serve this function. The strip is then cooled with a preformed groove that is resistant to deformation remaining.

The illustrated embodiment is also preformed in a similar manner to define pairs of inlet channels at spaced apart locations along the strip. Inlet channels 119 and 120 are two such channels. They are defined respectively by preformed portion 117 and preformed portion 118 (FIG. 9), and they intersect groove 116 of the illustrated embodiment at junctions suitably spaced along the strip, the junctions designated reference numeral 121 being representative and spaced at one-foot intervals (FIGS. 7 and 8). Like groove 116, these inlet channels are dimensioned to provide a slow flow of water, those of the illustrated embodiment having a generally semicircular shape with a radius on the order of 50 mils. The inlet channels may be slightly larger in cross-section than groove 116, and they serve with other features of the finished tubing as means for maintaining the first conduit in fluid communications with a secondary conduit defined by groove 116.

The manner in which strip 110 is folded lengthwise to form the tubing structure is illustrated in FIGS. 9 and 10, the tubing structure usually lying generally flat after folding, although it is shown circular for the purposes of illustration. First edge portion 112 and second edge portion 14 overlap to form first conduit 125, the main conduit or passageway for irrigation water. The folding may be accomplished by suitable known means such as passing the strip through a folding device that rolls one edge portion up over the other edge portion to obtain the configuration illustrated in FIGS. 9 and 10.

With the strip folded lengthwise, the two edge portions are joined together on opposite sides of groove 116 by suitable means such as heat sealing. This forms a seam extending lengthwise down the tubing in which groove 116 defines a secondary conduit. The heat sealing may be accomplished by pressing the two edge portions together on either side of the groove while applying sufficient heat to cause the two edge portions to bond together (around 400 degrees fahrenheit for the polyethylene of the illustrated embodiment). Suitable means such as passing the folded strip between heated rollers configured to apply opposing pressure to the two edge portions along opposite sides of the groove may be employed to produce the heat sealed seam. Drum assembly 70 and related components in FIG. 1 serve this function.

The sectional view of FIG. 10 illustrates the heat sealed seam of the illustrated embodiment. It includes heat sealed portion 126 extending along one side of groove 116 and heat sealed portion 127 extending along the opposite side of the groove. The second edge portion covers the groove so that the groove defines a secondary conduit within the seam extending lengthwise down the tape. This secondary conduit impedes the flow of water to achieve a slow drip rate that may be, for example, on the order of 0.1 to 0.6 gallons-per-minute per one hundred feet of tubing.

The tubing structure includes inlet means for maintaining fluid communications between the first conduit and the secondary conduit at a series of spaced apart locations along the secondary conduit. This is accomplished in the illustrated embodiment by a series of breaks in the seam, namely breaks 128 in heat sealed portion 126, that define a series of inlet ports. These breaks or discontinuities in heat sealed portion 126 (areas where the heat seal is omitted) and positioned adjacent junction 121 (FIG. 11). They allow water to flow down inlet channels 117 and 118 into the secondary conduit fluid formed by groove 116.

The tubing structure also includes outlet means for maintaining fluid communications between the secondary conduit and a series of spaced apart locations along the exterior of the tubing structure. This is accomplished in the illustrated embodiment by another series of breaks in the heat sealed seam, namely breaks 129 in heat sealed portion 127, that define a series of outlet ports (FIG. 11). These breaks may be spaced evenly between the inlet ports defined by breaks 126, and they allow water that has entered the secondary conduit defined by groove 116 to flow slowly from the secondary conduit to the exterior of the tubing structure. Breaks on the order of ¾ inch long are employed in the illustrated embodiments although other sizes are satisfactory. FIG. 12 shows edge 111 slightly raised in the area of break 129 to illustrate the outlet port.

Further details of the inlet ports defined by breaks 128 are shown in FIG. 13. Depression 127A represents a slight deforming of edge portion 112 caused by the application of pressure to form heat sealed portion 127. A corresponding depression adjacent heat sealed portion 126 is not shown in FIG. 13 since this portion of the seam is broken by break 128. Each break 128 in the heat sealed seam allows water to pass in the direction illustrated by arrow 130 between first edge portion 112 and second edge portion 114. This enables water to flow down the inlet channels into the secondary conduit defined by groove 116.

As the second edge portion flexes in the area designated 114A toward edge portion 112 under pressure of water within the main conduit (FIG. 7), this passageway into and along the secondary conduit is slightly decreased in size and the rate of water flow correspondingly decreased. This achieves an automatic throttling effect that regulates the flow of water to maintain a steady drip rate from the secondary conduit even though the pressure of water in the main conduit varies, variance over a range from about 5 to 15 pounds-per-square inch being typical.

The details of the outlet ports defined by breaks 129 are similar (FIG. 14). Like depression 127A in FIG. 13, depression 126A in FIG. 14 represents a slight deforming related to heat sealed portion 126. And each break 129 in the heat sealed seam enables first edge portion 112 and second edge portion 116 to separate so that water can trickle out of the secondary conduit defined by groove 116. Water is thereby emitted in the direction illustrated by arrow 131.

The finished tubing may be buried adjacent rows of crops, lengths up to ⅛ mile or more being suitable. Water pumped into one end of the tubing flows along the tubing, some entering the secondary conduit at each subsequent inlet port. Water then flows from the inlet ports along the secondary conduit to the outlet ports where it is emitted into the soil at a substantially consistent rate along the tubing.

Thus, drip irrigation tape fabricated with the apparatus of this invention employs the expedient of making the secondary conduit part of the seam. But unlike other drip irrigation tape, it does so with a strip of material having a preformed groove extending along one edge that resists deformation. The preformed groove resists external forces tending to collapse it as well as electrostatic forces tending to pull the two edge portions together.

In addition, the heat sealed seam of one embodiment employs breaks in the seam to define inlet passageways and outlet passageways at spaced apart locations along the tape. These passageways can be easily and inexpensive fabricated with the preformed groove and heat sealed seam to achieve a controlled drip rate along a length of tubing that is not dependent on outlet port size and less prone to malfunction.

Modifications within the inventive concepts of this invention include those illustrated in the alternated embodiment of FIGS. 15 and 16. Reference numbers in these figures are increased by 100 over those designating similar parts in FIGS. 7-14. The alternate embodiment illustrated in these figures employ one inlet channel at each junction rather than the pair of inlet channels, channels 119 and 120, in FIGS. 7-9. Inlet channels 220 formed by preformed portions 218, intersect groove 216 at junctions 221 to define the inlets. These inlets maintain fluid communications between the first conduit and the second conduit defined by groove 216 much like the inlets in the embodiment of FIGS. 7-14.

But there is a difference in the vicinity of each junction 221. This difference is the secondary conduit divider, divider 240, formed by joining first edge portion 212 to second edge portion 214 slightly downstream from each junction 221. Dividers 240 are formed adjacent each junction 221 in this position by crushing preformed portion 215 during heat sealing, or by omitting groove 216 in this area during the shaping of first edge portion 212 with two edge portions being joined together to block the secondary conduit adjacent the junctions.

This divides the secondary conduit into segments that are the general length of the interval between junctions. Water entering the secondary conduit through any particular inlet channel can only flow out of an outlet that is located along the corresponding segment of the secondary conduit. By locating just one outlet along each segment near the end of the segment opposite the inlet channel, water flow can be more precisely controlled. In addition, the path the water takes along the secondary conduit can be lengthened in this way so that secondary conduit size can be increased for the same drip rate. Furthermore, with the inlet channel inclined, as illustrated, relative to the direction of water flow in the main conduit (the direction of water flow being illustrated by arrow 242 in FIG. 16), any particulate material in the water tends to be swept past the inlet channel instead of flowing back into the inlet. Hence, this modification in the design provides additional benefits.

An alternate shaping assembly and an alternate heat sealing assembly for use in fabricating drip irrigation tape with this modified design are illustrating in FIGS. 17 and 18. Reference numerals are increased by 300 over those of similar parts in FIGS. 1-6.

The alternate shaping assembly includes divider member 332A in first drum 331 that segments groove 332, the illustrated drum employing three evenly spaced divider members around its circumference. This preforms divider 240 in strip 210 to segment groove 216.

The alternate heat sealing assembly includes bridge member 380A that bridges ribs 381 and 382 to heat seal the two edges of strip 210 together at divider 240. Three bridge members are employed in illustrated drum 370, each being near a flat spot 383 to result in a divider near each junction 221. Thus, these changes in design enable fabrication of drip irrigation tape according to FIGS. 15 and 16.

As various changes may be made in the form, construction, and arrangement of the procedures and parts described herein, without departing from the spirit and scope of the invention and without sacrificing any of its advantages, it is to be understood that all matter herein is to be interpreted as illustrative and not in any limiting sense.

What is claimed is:

1. An apparatus for fabricating tubing suitable for drip irrigation applications, which comprises:
    means for shaping a strip of flexible material having a first edge portion and a second edge portion to define a groove in the first edge portion that extends lengthwise along the strip;
    means for folding the strip lengthwise with the first edge portion and second edge portion overlapping to form a first conduit; and
    means for joining the first edge portion and the second edge portion together along opposite sides of the groove to form a seam in which the groove defines a secondary conduit and along which breaks in the seam define a series of inlet ports between the first conduit and secondary conduit and a series of outlet ports between the secondary conduit and the exterior of the tubing.

2. The apparatus recited in claim 1 wherein the shaping means comprises:
    a rotatable first drum having a circumference with an inwardly-extending annular channel and a series of suction ports within the channel;
    means for passing the strip of flexible material over the first drum with the first edge portion over the annular groove; and
    means for enabling a vacuum to be drawn through the suction ports to pull the first edge portion into the annular channel and preform a groove in the strip.

3. The apparatus recited in claim 2, further comprising:
    means for heating the flexible strip prior to passing the strip over the first drum.

4. The apparatus recited in claim 2 wherein the shaping means further comprises:
    means for cooling the first drum.

5. The apparatus recited in claim 1 wherein the joining means comprises:
    means for heat sealing the first edge portion and the second edge portion together.

6. The apparatus recited in claim 5 wherein the heat sealing means comprises:
    a rotatable second drum having a circumference and a pair of outwardly-extending annular ribs around the circumference;
    means for passing the folded strip over the second drum with the pair of annular ribs straddling the groove; and
    means for heating the annular ribs and for pressing the annular ribs against the strip to bond the first edge portion to the second edge portion along opposite sides of the groove.

7. The apparatus recited in claim 6 wherein the heating means comprises:
    an electrical cartridge resistor in heat transfer relationship with the annular ribs; and
    means for supplying electric current to the cartridge resistor as the second drum is rotated.

8. The apparatus recited in claim 6 wherein the heat sealing means further comprises:
    a flat spot on one of the pair of annular ribs that produces a break in the seam.

9. The apparatus recited in claim 6 wherein the heat sealing assembly further comprises:
    means for cooling the second drum as it rotates.

10. The apparatus recited in claim 1, further comprising:
    means for segmenting the secondary conduit.

11. The apparatus recited in claim 1, further comprising:
    means for extruding a thin plastic film from which to fabricate tubing.

12. A method for fabricating tubing suitable for drip irrigation applications, which comprises:
    shaping a strip of flexible material having a first edge portion and a second edge portion to define an indented groove in the first edge portion that extends lengthwise along the strip;
    folding the strip lengthwise with the first edge portion and the second edge portion overlapping to form a first conduit; and
    joining the first edge portion and the second edge portion along opposite sides of the groove to form a seam in which the groove defines a secondary conduit of depth equal to the depth of the groove and along which breaks in the seam define a series of inlet ports between the main conduit and the secondary conduit and a series of outlet ports between the secondary conduit and the exterior of the tubing structure.

13. The method recited in claim 12 wherein the step of shaping the strip further comprises:
    heating the strip;
    preforming a groove along the first edge portion of the strip; and the
    cooling the strip.

14. The method recited in claim 12, further comprising:
    preforming a series of inlet channels in the first edge portion that intersects the groove at spaced apart location.

15. The method recited in claim 12 further comprising:
    overlapping the first edge portion and the second edge portion to enable a part of the second edge portion to overlap the inlet channels and throttle a fluid flow into the secondary conduit in response to the pressure of the fluid within the first conduit.

16. The method recited in claim 12 wherein the step of joining the first edge portion and the second edge portion further comprises:
    heat sealing the first edge portion and the second edge portion along opposite sides of the groove.

17. The method recited in claim 16, further comprising;
    omitting the heat seal at selected locations along the groove to define the inlet ports and the outlet ports.

18. A method for fabricating tubing suitable for drip irrigation applications, which comprises:
    shaping a strip of flexible material having a first flat edge portion and a second flat edge portion to form an indented groove in the first edge portion that extends lengthwise along the strip;
    folding the strip lengthwise with the first edge portion and the second edge portion overlapping with opposing portions of their flat faces in face to face contact to form a first conduit; and
    joining the contacting faces of the first edge portion and the second edge portion along opposite sides of the groove to form a seam in which the groove defines a secondary conduit of depth equal to the depth of the groove and along which breaks in the seam define a series of inlet ports between the main conduit and the secondary conduit and a series of outlet ports between the secondary conduit and the exterior of the tubing structure.

* * * * *